United States Patent [19]

Oishi

[11] Patent Number: 5,115,366
[45] Date of Patent: May 19, 1992

[54] MAGNETIC DISK CARTRIDGE HAVING A CENTER CORE WHICH ENGAGES WITH A DRIVE SPINDLE OF A DISK DRIVE

[75] Inventor: Kengo Oishi, Kanagawa, Japan

[73] Assignee: Fuji Photo Film Co., Ltd., Kanagawa, Japan

[21] Appl. No.: 499,743

[22] Filed: Mar. 27, 1990

[30] Foreign Application Priority Data

Apr. 6, 1989 [JP] Japan ........................... 1-40716

[51] Int. Cl.⁵ ................... G11B 23/03; G11B 5/016
[52] U.S. Cl. ..................... 360/133; 360/99.05; 360/99.04
[58] Field of Search ............ 360/99.04, 99.05, 99.08, 360/99.12, 133

[56] References Cited

U.S. PATENT DOCUMENTS

| | | | |
|---|---|---|---|
| 4,796,140 | 1/1989 | Wakabayashi et al. | 360/133 |
| 4,827,470 | 5/1989 | Odawara et al. | 360/133 |
| 4,847,826 | 7/1989 | Sakaguchi et al. | 360/133 |
| 4,864,452 | 9/1989 | Thompson et al. | 360/133 |
| 4,896,232 | 1/1990 | Sugawara | 360/99.04 |

Primary Examiner—A. J. Heinz
Assistant Examiner—Jefferson Evans
Attorney, Agent, or Firm—Sughrue, Mion, Zinn Macpeak & Seas

[57] ABSTRACT

A magnetic disk cartridge comprises a magnetic disk, which is secured to a center core and rotates when the center core rotates, and a housing which accommodates the magnetic disk and the center core such that they can rotate. The center core is provided with an outer circumferential annular rib with which the position of the center core is adjusted with respect to the position of a drive spindle which rotates the center core, and an inner circumferential annular rib which fits onto a center shaft of the drive spindle. A third rib is located between the outer circumferential annular rib and the inner circumferential annular rib. The third rib engages with a groove in the drive spindle.

3 Claims, 3 Drawing Sheets

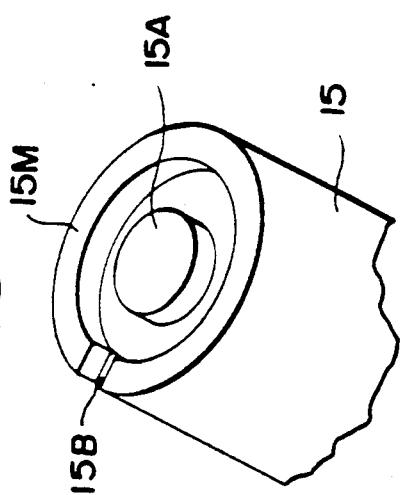
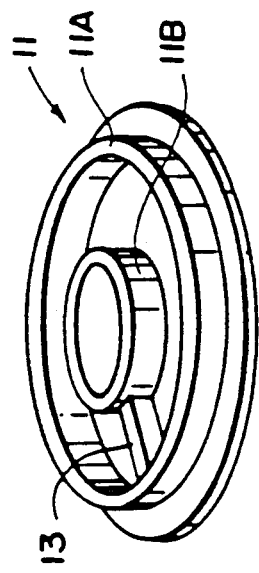
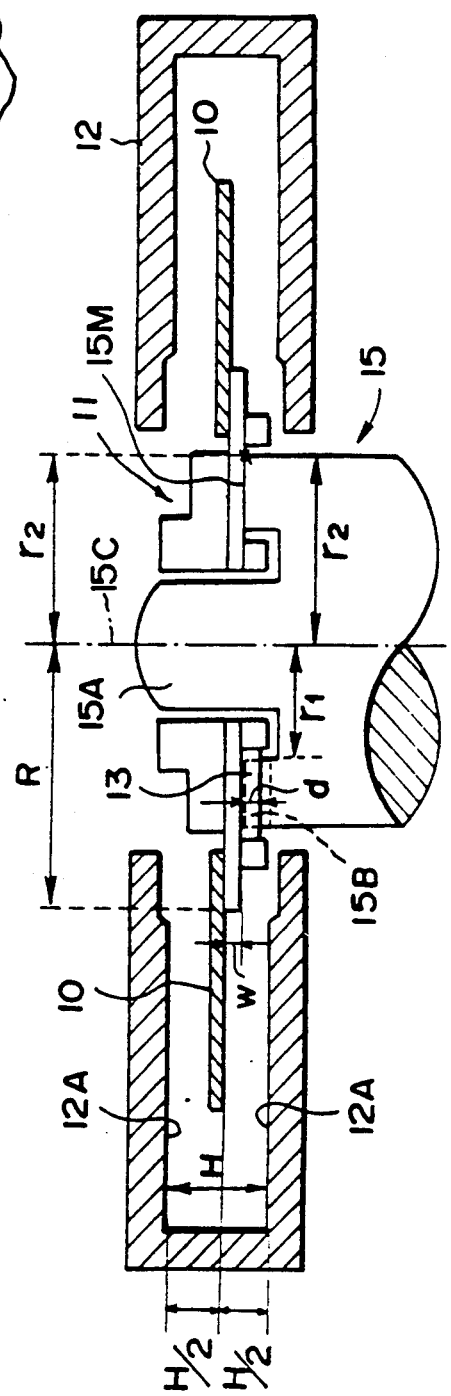

MAGNETIC DISK CARTRIDGE HAVING A CENTER CORE WHICH ENGAGES WITH A DRIVE SPINDLE OF A DISK DRIVE

BACKGROUND OF THE INVENTION

1. Field of the Invention

This invention relates to a magnetic disk cartridge. This invention particularly relates to a magnetic disk cartridge in which a magnetic disk is secured to a center core and rotates when the center core is driven by a drive spindle of a disk drive means, said magnetic disk cartridge being kept very small in size.

2. Description of the Prior Art

Magnetic disks having various sizes are accommodated in magnetic disk cartridges having corresponding sizes so that the magnetic disks can be rotated therein. For example, it is desirable that a magnetic disk cartridge which is to be incorporated in a camera, or the like, be kept very small in size. In the case of conventional magnetic disk cartridges accommodating micro floppy disks (having a size of, for example, 3.5 inches), which cartridges are larger than the magnetic disk cartridges incorporated in cameras, or the like, the micro floppy disk is secured to a center core, which is constituted of a metal capable of adhering to a magnet through magnetic attraction. When a micro floppy disk accommodated in a magnetic disk cartridge is rotated in a disk drive means, a magnet secured to a drive spindle of the disk drive means, which rotates the micro floppy disk, magnetically chucks the center core. The center core is provided with two holes, which engage with protrusions on the drive spindle an engagement hole and a second hole called the drive hole. However, for magnetic disk cartridges which are smaller than conventional magnetic disk cartridges accommodating micro floppy disks, it becomes difficult to provide the center core with an engagement hole which can engage with protrusions on the drive spindle of a disk drive means. This is because the center core must be kept very small in size, and therefore it does not have a sufficient area in which to form an engagement hole. Also, with current processing techniques, an engagement hole cannot be formed accurately in such a very small center core.

Accordingly, nowadays there is a need for a very small magnetic disk cartridge having a center core which can engage a drive spindle of a disk drive means easily and reliably.

In order for this need to be met, it has been suggested that the part of the center core of a magnetic disk, which is to be engaged with the drive spindle of a disk drive means, be constituted of a plastic material and molded together with a metal part which is chucked by a magnet of the drive spindle. For this purpose, an insert injection molding, or the like, could be employed. Also, the center core could be provided with a rib which engages with a groove in the drive spindle. In order for the magnetic disk to be rotated reliably when a large force is applied to it, it is desirable that the height of the rib be as large as possible. However, in order for the center core to engage reliably with the spindle and for the magnetic disk to be protected from any damage when the magnetic disk cartridge is loaded into a disk drive means, the height of the rib should be as small as possible. Specifically, if the height of the rib is large, the rib may collide strongly with the drive chucking surface of the drive spindle and break when the magnetic disk cartridge is loaded into a disk drive means. Also, if the rib does not engage with the groove in the drive spindle of the disk drive means and the groove is formed, for example, at part of an annular rib of the drive spindle, the center core to which the magnetic disk is secured will be forced away from its correct position in the magnetic disk cartridge when the magnetic disk cartridge is loaded into a disk drive means. As a result, the magnetic disk will come into contact with the surfaces of the inner walls of the housing of the magnetic disk cartridge and will be scratched or damaged thereby.

Additionally, for very small magnetic disk cartridges, it is necessary for the center core to be rotated very accurately. The accuracy with which the center core is rotated depends on the accuracy with which the center core and the drive spindle engage with each other, and the direction along which the drive force is transmitted from the drive spindle to the center core.

SUMMARY OF THE INVENTION

The primary object of the present invention is to provide a magnetic disk cartridge having a center core which will engage with a drive spindle of a disk drive means easily and reliably and which can be kept very small in size.

Another object of the present invention is to provide a magnetic disk cartridge wherein a rib on the center core of the magnetic disk will accurately transmit the drive force from the drive spindle of a disk drive means to the center core, said rib having a height such that it will not be broken by the drive spindle and will not damage the magnetic disk.

The specific object of the present invention is to provide a magnetic disk cartridge wherein the center core is rotated very accurately.

The present invention provides a magnetic disk cartridge comprising a magnetic disk, a center core which is secured to the magnetic disk and allows the disk to be rotated, and a housing which accommodates the magnetic disk and the center core such that they can rotate, wherein said center core is provided with:

i) an outer circumferential annular rib with which the position of said center core is adjusted with respect to the position of a drive spindle which rotates said center core, ii) an inner circumferential annular rib which fits onto a center shaft of said drive spindle, and iii) a third rib which is located between said outer circumferential annular rib and said inner circumferential annular rib and which engages with an engagement means of said drive spindle.

The present invention also provides a magnetic disk cartridge as defined above, wherein the height of said third rib is set such that, if said magnetic disk cartridge is loaded into a disk drive means such that said third rib rests on a part of said drive spindle other than said engagement means and does not engage with said engagement means, thus forcing said center core away from its correct position, the outer circumferential part of said center core will not come into contact with the inner surfaces of said housing.

The present invention further provides a magnetic disk cartridge as defined above, wherein:

a) wall members on the inner side surface of said inner circumferential annular rib constitute an approximately V-shaped section and abut against said center shaft of said drive spindle, and b) said third rib extends obliquely with respect to the radial direction of said center core such that, when said third rib engages with said engagement means of said drive spindle and said center core is rotated by said drive spindle, said wall members are always forced to abut against said center shaft of said drive spindle.

With the first magnetic disk cartridge in accordance with the present invention, the center core has an outer circumferential annular rib, with which the position of the center core is adjusted with respect to the position of the drive spindle which rotates the center core, and an inner circumferential annular rib which fits onto the center shaft of the drive spindle. Also, the third rib which engages with the engagement means of the drive spindle is located between the outer circumferential annular rib and the inner circumferential annular rib. When the magnetic disk cartridge is loaded into a disk drive means, the inner circumferential annular rib fits onto the center shaft of the drive spindle of the disk drive means. Also, the outer circumferential annular rib is guided by a chucking surface of the drive spindle and adjusts the position of the center core with respect to the position of the drive spindle. Additionally, the third rib engages with the engagement means of the drive spindle. Therefore, the center core of the first magnetic disk cartridge in accordance with the present invention can engage with the drive spindle of the disk drive means easily and reliably and can be kept very small in size.

Also, with the second magnetic disk cartridge in accordance with the present invention, the height of the third rib is set to a value such that, if the magnetic disk cartridge is loaded into a disk drive means such that the third rib rests on a part of the drive spindle other than the engagement means and does not engage with the engagement means, thus forcing the center core away from its correct position, the outer circumferential part of the center core will not come into contact with the inner surfaces of the housing of the magnetic disk cartridge. Therefore, there is no risk that the magnetic disk will be damaged.

With the third magnetic disk cartridge in accordance with the present invention, wall members on the inner side surface of the inner circumferential annular rib constitute an approximately V shaped section and abut against the center shaft of the drive spindle. Also, the third rib extends obliquely with respect to the radial direction of the center core such that, when the third rib engages with the engagement means of the drive spindle and the center core is rotated by the drive spindle, the wall members are always forced to abut against the center shaft of the drive spindle. Therefore, the center core can be rotated very accurately.

BRIEF DESCRIPTION OF THE DRAWINGS

FIG. 1 is a perspective view showing the center core of an embodiment of the magnetic disk cartridge in accordance with the present invention, FIG. 2A is a schematic sectional view showing the embodiment of the magnetic disk cartridge in accordance with the present invention, wherein the center core of FIG. 1 is correctly positioned on the drive spindle, FIG. 2B is a perspective view of the end of the drive spindle.

DESCRIPTION OF THE PREFERRED EMBODIMENTS

The present invention will hereinbelow be described in further detail with reference to the accompanying drawings.

Figure 3:
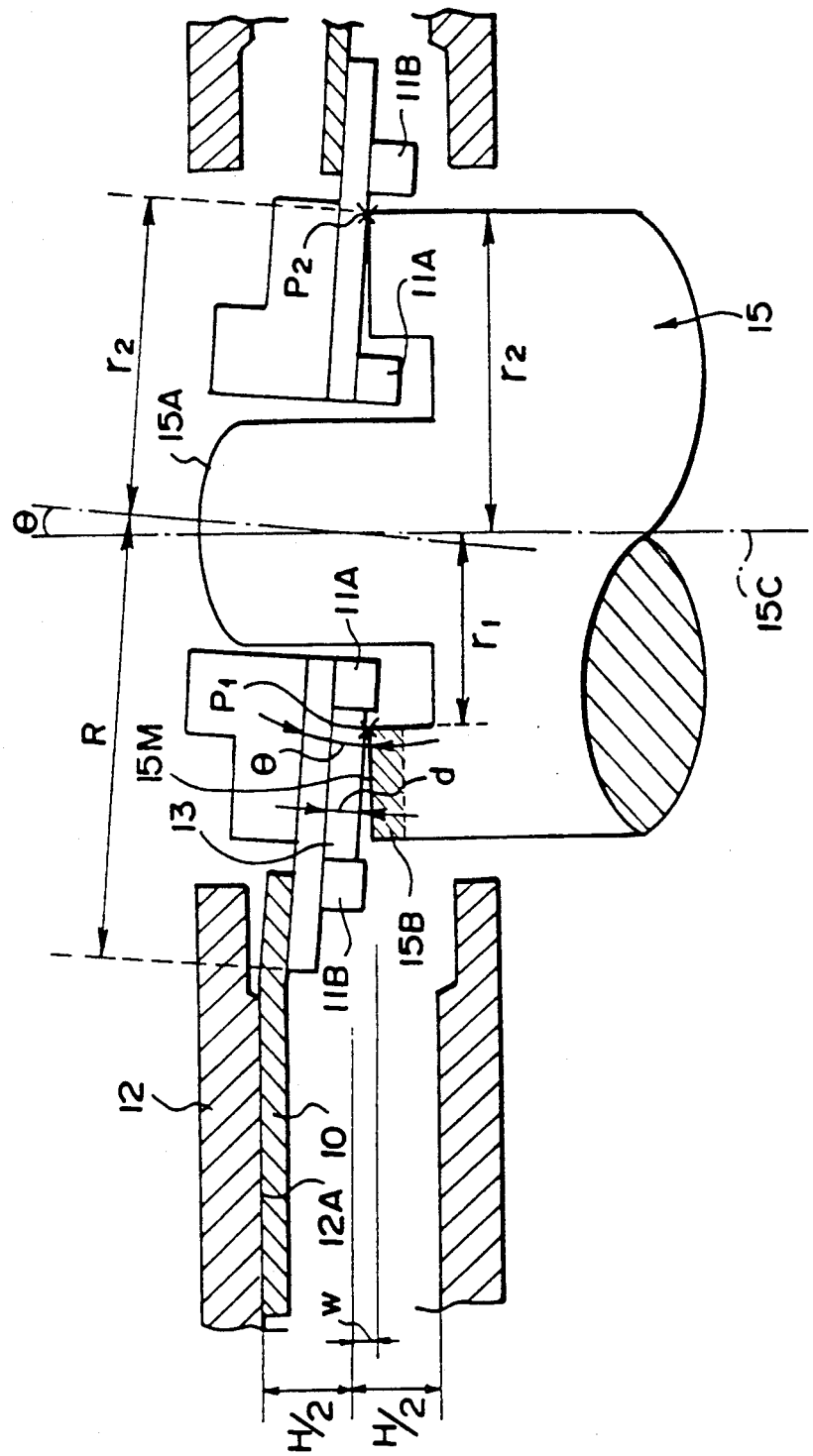
FIG. 3 is a schematic sectional view showing the embodiment of the magnetic disk cartridge in accordance with the present invention, wherein the center core of FIG. 1 has been loaded such that it slants with respect to its correct position on the drive spindle.

FIGS. 1, 2A, 2B and 3 show a first embodiment of the magnetic disk cartridge in accordance with the present invention. FIG. 1 is a perspective view showing the rear side of a center core 11 of the magnetic disk cartridge. FIG. 2A is a sectional view showing the the magnetic disk cartridge, wherein the center core 11 is in its correct position on a drive spindle 15 of a disk drive means. FIG. 2B is a perspective view of the end of the drive spindle. FIG. 3 is a sectional view showing the the magnetic disk cartridge, wherein the center core 11 has been loaded such that it slants with respect to its correct position on the drive spindle 15.

With reference to FIGS. 1, 2A, 2B and 3, the magnetic disk cartridge comprises the center core 11, a magnetic disk 10 secured to the center core 11, and a housing 12 which accommodates the magnetic disk 10 and the center core 11 so that they can rotate. The center core 11 is provided with an outer circumferential annular rib 11A with which the position of the center core 11 is adjusted with respect to the position of the drive spindle 15. The center core 11 is also provided with an inner circumferential annular rib 11B which fits onto a center shaft 15A of the drive spindle 15. A third rib 13 is located between the outer circumferential annular rib 11A and the inner circumferential annular rib 11B. The third rib 13 engages with a groove formed at part of an annular magnet chucking surface 15M of the drive spindle 15. When the drive spindle 15 rotates, the third rib 13 transmits the drive force of the drive spindle 15 to the center core 11.

The height of the third rib 13 should preferably be set such that, if the magnetic disk cartridge is loaded into the disk drive means such that, as shown in FIG. 3, the third rib 13 does not engage with groove 15B and rests on the magnet chucking surface 15M of the drive spindle 15, the magnetic disk 10 will not come into contact with the inner surfaces 12A, 12A of the housing 12, even though the center core 11 slants away from its correct position.

As shown in FIGS. 2A and 3, when the center core 11 slants away from its correct position and the magnetic disk 10 is located so that it is in contact with the inner surfaces 12A, 12A of the housing 12, the angle of inclination $\theta$ of the center core 11 is equal to the sum of the inclination $\theta c$ of the center core 11 itself and the inclination $\Delta\theta$ corresponding to the thickness of the center core 11. The magnetic disk 10 abuts against the inner surfaces 12A, 12A of the housing 12 when the deviation of the outer circumferential part of the center core 11 from the horizontal position reaches H/2, where H denotes the distance between the inner surfaces 12A, 12A of the housing 12. Therefore, the following relationship holds:

$$\frac{H}{2} - w = (R + r_2) \tan \theta \quad (1)$$
$$= (R + r_2) \tan (\theta_c + \Delta\theta)$$
$$= (R + r_2) \frac{\tan \theta_c - \tan \Delta\theta}{1 - \tan \theta_c \tan \Delta\theta}$$

In Formula (1), r1 denotes the inner radius of the chucking surface 15M of the drive spindle 15, i.e. the distance between the center line 15C of the drive spindle 15 and the point P1 at which the third rib 13 rests on the chucking surface 15M of the drive spindle 15 when the third rib 13 has not engaged with the groove 15B. Also, r2 denotes the outer radius of the chucking surface 15M of the drive spindle 15, i.e. the distance between the center line 15C of the drive spindle 15 and the point P2 at which the center core 11 is supported on the outer circumferential edge of the drive spindle 15. R denotes the radius of the center core 11, and w denotes the thickness of the base plate of the center core 11.

Also, the following approximation holds.

$$\tan \theta_c \cdot \tan \Delta\theta = 0$$

Therefore, Formula (1) can be simply expressed as $$\frac{H}{2} - w \approx (R + r_2)(\tan \theta_c - \tan \Delta\theta) \quad (2)$$

Because w is approximately expressed as $$w \approx (R + r_2) \tan \Delta\theta$$

the following approximation holds.

$$\frac{H}{2} - w \approx (R + r_2) \tan \theta_c \quad (3)$$

When the center core 11 inclines at an angle $\theta_c$, the relationship between the angle $\theta_c$ and the height d of the third rib 13 is expressed as:

$$\theta_c \approx \tan^{-1} \frac{d}{r_1 + r_2} \quad (4)$$

From Formulas (3) and (4), the following formula is obtained:

$$\frac{H}{2} \approx (R + r_2) \frac{d}{r_1 + r_2} \quad (5)$$

When Formula (5) holds, the outer circumferential part of the center core 11 comes into contact with the inner surfaces 12A, 12A of the housing 12, and the magnetic disk 10 abuts against the inner surfaces 12A, 12A. Therefore, in order that the magnetic disk 10 will not abut against the inner surfaces 12A, 12A, the following inequality must hold:

$$\frac{H}{2} > (R + r_2) \times \frac{d}{r_1 + r_2} \quad (6)$$

Accordingly, in order that the magnetic disk 10 does not abut against the inner surfaces 12A, 12A, the height d of the third rib 13 must satisfy the inequality expressed as:

$$d < \frac{H}{2} \times \frac{r_1 + r_2}{R + r_2} \quad (7)$$

By way of example, if the distance H between the inner surfaces 12A, 12A of the housing 12 is 1.2 mm, the inner radius r1 and the outer radius r2 of the chucking surface 15M of the drive spindle 15 are respectively 3.1 mm and 5.5 mm, and the radius R of the center core 11 is 7.5 mm, the height d of the third rib 13 should satisfy the inequality expressed as:

$$d < \frac{1.2}{2} \times \frac{3.1 + 5.5}{7.5 + 5.5}$$

Therefore, the height d of the third rib 13 should be smaller than 0.4 mm.

The minimum value of the height d necessary for ensuring the engagement of the third rib 13 with the groove 15B of the drive spindle 15 depends on the accuracy with which the third rib 13 is processed, the accuracy with which the groove 15B is processed, or the like. By way of example, in the case described above, it is necessary for the height d to be at least approximately 0.2 mm.

A second embodiment of the magnetic disk cartridge in accordance with the present invention will hereinbelow be described with reference to FIGS. 4, 5, and 6. In this embodiment, a center core 21 is provided with wall members 24, 24 which are formed on the inner side surface of an inner circumferential annular rib 21A. The wall members 24, 24 constitute an approximately V-shaped section and abut against the side surface of the center shaft 15A of the drive spindle 15. A third rib 23 is formed between the inner circumferential annular rib 21A and the outer circumferential annular rib 21B. The third rib 23 extends obliquely with respect to the radial direction of the center core 21 such that, when it engages with the groove 15B of the drive spindle 15 and the center core 21 is rotated by the drive spindle 15, the wall members 24, 24 are always forced to abut against the center shaft 15A of the drive spindle 15.

Figure 4:
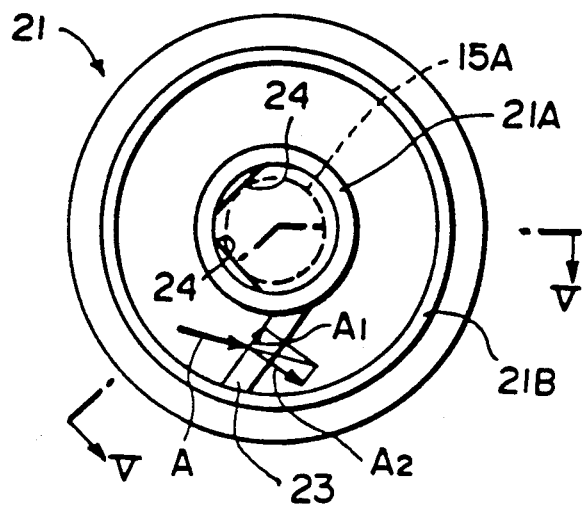
FIG. 4 is a plan view showing a center core of another embodiment of the magnetic disk cartridge in accordance with the present invention.
Figure 5:
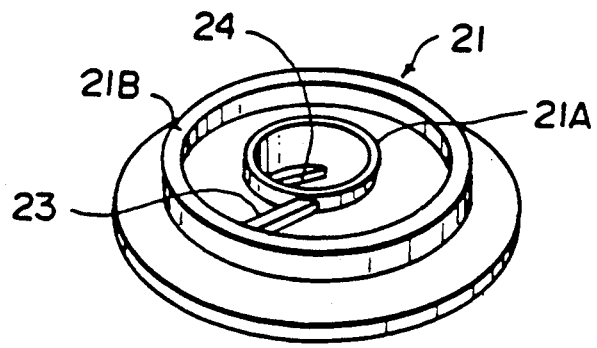
FIG. 5 is a perspective view showing the center core of FIG. 4.

Because the third rib 23 extends obliquely with respect to the radial direction of the center core 21, when the groove 15B of the drive spindle 15 engages with the third rib 23 and pushes it in the tangential direction indicated by the arrow A in FIG. 4, two components of force having vectors A1 and A2 are transmitted by the groove 15B to the third rib 23. The component of force having the vector A1 pushes one of the wall members 24, 24 (i.e. the lower wall member 24 in FIG. 4) toward the side surface of the center shaft 15A of the drive spindle 15. The component of force having the vector A2 pushes the other wall member 24 toward the side surface of the center shaft 15A of the drive spindle 15. Therefore, the wall members 24, 24 are always forced in directions in which they will abut against the side surface of the center shaft 15A.

Figure 6:
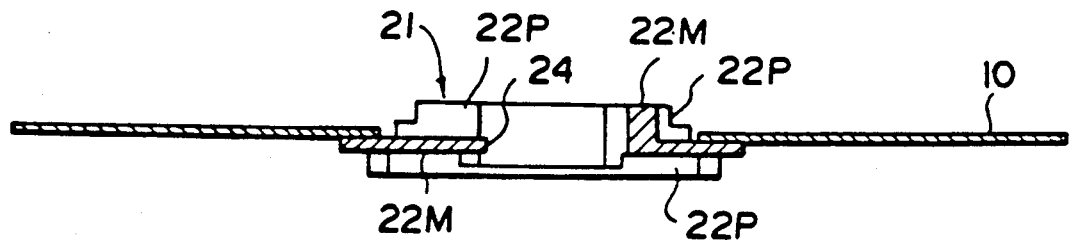
FIG. 6 is a sectional view showing a magnetic disk secured to the center core of FIG. 4.

As shown in FIG. 6, in the second embodiment, the center core 21 comprises a main body 22M, which is constituted of a metal capable of being attracted by a magnet, and a plastic part 22P which is molded together with the main body 22M with an insert injection molding process. The surface of the main body 22M, which surface comes into contact with the magnet chucking surface 15M of the drive spindle 15, is laid bare. Also, the main body 22M constitutes the wall members 24, 24. This is because the wall members 24, 24 always abut against the side surface of the center shaft 15A of the drive spindle 15 and undergo friction.

I claim:

1. A magnetic disk cartridge for a disk drive means including a drive spindle having a center shaft and having a groove formed in said drive spindle, said magnetic disk cartridge comprising a magnetic disk, which is secured to a center core and rotates when said center core is rotated by said drive spindle, and a housing which rotatably accommodates the magnetic disk and the center core, the center core including a base plate, wherein said center core is provided with:
   i) an outer circumferential annular rib with which the position of said center core is adjusted with respect to the position of said drive spindle which rotates said center core,
   ii) an inner circumferential annular rib which fits onto said center shaft of said drive spindle, and
   iii) a third rib having a preset height d as measured from said base plate and which is located between said outer circumferential annular rib and said inner circumferential annular rib and which engages with said groove formed in said drive spindle;

wherein said drive spindle includes an annular chucking surface for contacting said center core, said groove being formed in said chucking surface; and further wherein the preset height d of said third rib must satisfy the inequality as follows:

$$d < \frac{H}{2} \times \frac{r_1 - r_2}{R + r_2}$$

where H denotes the distance between upper and lower, inner surfaces of said housing;
$r_1$ denotes an inner radius of said annular chucking surface of said drive spindle;
$r_2$ denotes an outer radius of said annular chucking surface of said drive spindle; and
R denotes a radius of said center core.

2. A magnetic disk cartridge as defined in claim 1 wherein the preset height d of said third rib is set such that, if said magnetic disk cartridge is loaded into the disk drive means such that said third rib rests on a part of said drive spindle other than said groove and does not engage with said groove, thus forcing said center core to incline away from its correct position, the outer circumferential part of said center core will not come into contact with the inner surfaces of said housing.

3. A magnetic disk cartridge as defined in claim 1 wherein:
   a) wall members on the inner side surface of said inner circumferential annular rib constitute an approximately V-shaped section and abut against said center shaft of said drive spindle, and
   b) said third rib extends obliquely with respect to the radial direction of said center core such that, when said third rib engages with said groove of said drive spindle and said center core is rotated by said drive spindle, said wall members are always forced to abut against said center shaft of said drive spindle.

* * * * *